United States Patent
Mei et al.

(10) Patent No.: US 9,754,188 B2
(45) Date of Patent: Sep. 5, 2017

(54) TAGGING PERSONAL PHOTOS WITH DEEP NETWORKS

(71) Applicant: MICROSOFT TECHNOLOGY LICENSING, LLC, Redmond, WA (US)

(72) Inventors: Tao Mei, Beijing (CN); Jianlong Fu, Beijing (CN); Kuiyuan Yang, Beijing (CN); Yong Rui, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/522,194

(22) Filed: Oct. 23, 2014

(65) Prior Publication Data

US 2016/0117574 A1 Apr. 28, 2016

(51) Int. Cl.
*G06K 9/62* (2006.01)
*G06F 17/30* (2006.01)

(52) U.S. Cl.
CPC ....... *G06K 9/6256* (2013.01); *G06F 17/3028* (2013.01); *G06F 17/30247* (2013.01); *G06F 17/30256* (2013.01); *G06K 9/627* (2013.01)

(58) Field of Classification Search
None
See application file for complete search history.

(56) References Cited

U.S. PATENT DOCUMENTS

| | | | | |
|---|---|---|---|---|
| 6,128,606 A * | 10/2000 | Bengio | ................. | G06F 17/509 706/10 |
| 8,504,361 B2 * | 8/2013 | Collobert | .............. | G06F 17/277 704/232 |
| 2007/0005566 A1 * | 1/2007 | Bobick | ............... | G06F 17/2795 |
| 2008/0168070 A1 * | 7/2008 | Naphade | ........... | G06F 17/30038 |
| 2009/0083332 A1 * | 3/2009 | Datta | .................... | G06K 9/6263 |
| 2009/0141969 A1 * | 6/2009 | Yu | ............................ | G06N 3/08 382/157 |
| 2013/0325865 A1 * | 12/2013 | Georgakis | ......... | G06F 17/30598 707/737 |
| 2014/0201126 A1 * | 7/2014 | Zadeh | .................... | G06K 9/627 706/52 |
| 2014/0310218 A1 * | 10/2014 | Min | ........................ | G06N 3/08 706/16 |
| 2014/0351264 A1 * | 11/2014 | Murray | ............. | G06F 17/30247 707/748 |
| 2015/0125049 A1 * | 5/2015 | Taigman | ............ | G06K 9/00268 382/118 |

(Continued)

OTHER PUBLICATIONS

Marques—Semi-autmoatic Semantic Annotation of images using Machine Learning Techniques,—The Semantic Web—ISWC 2003.*

(Continued)

*Primary Examiner* — Iman K Kholdebarin
(74) *Attorney, Agent, or Firm* — Schwegman Lundberg & Woessner, P.A.

(57) ABSTRACT

Techniques and constructs to facilitate automatic tagging can provide improvements in image storage and searching. The constructs may enable training a deep network using tagged source images and target images. The constructs may also train a top layer of the deep network using a personal photo ontology. The constructs also may select one or more concepts from the ontology for tagging personal digital images.

20 Claims, 4 Drawing Sheets

(56) References Cited

U.S. PATENT DOCUMENTS

| | | | | |
|---|---|---|---|---|
| 2015/0170002 | A1* | 6/2015 | Szegedy | G06K 9/4628 382/156 |
| 2015/0310862 | A1* | 10/2015 | Dauphin | G10L 15/1815 704/257 |
| 2015/0363688 | A1* | 12/2015 | Gao | G06N 3/04 706/27 |
| 2015/0371360 | A1* | 12/2015 | Mohamed | G06K 9/6212 382/282 |
| 2016/0019458 | A1* | 1/2016 | Kaufhold | G01S 7/417 342/25 F |
| 2016/0034809 | A1* | 2/2016 | Trenholm | H04L 41/5041 706/20 |

OTHER PUBLICATIONS

Bengio, Yoshua, Learning Deep Architectures for AI, Journal of foundations and trends in machine learning vol. 2, Issue 1, Jan. 2009, 130 Pages.*

Karpathy Andrej et al, "Large scale video Classificaiton with convolutional neural networks" 2014 IEEE conf. on computer vision, Jun. 23, 2014, p. 1725-1732.*

Bengio, Yoshua, "Learning Deep Architectures for AI", In Journal of Foundations and Trends® in Machine Learning, vol. 2, Issue 1, Jan. 2009, 130 pages.

Cao, et al., "Annotating Collections of Photos using Hierarchical Event and Scene Models", In Proceedings of IEEE Conference on Computer Vision and Pattern Recognition, Jun. 23, 2008, 8 pages.

Chua, et al., "NUS-WIDE: A Real-World Web Image Database from National University of Singapore", In Proceedings of the ACM International Conference on Image and Video Retrieval, Jul. 8, 2009, 9 pages.

Dalal, et al., "Histograms of Oriented Gradients for Human Detection", In Proceedings of IEEE Computer Society Conference on Computer Vision and Pattern Recognition, vol. 1, Jun. 25, 2005, 8 pages.

Deng, et al., "ImageNet: A Large-Scale Hierarchical Image Database", In Proceedings of IEEE Conference on Computer Vision and Pattern Recognition, Jun. 20, 2009, pp. 248-255.

Gallagher, et al., "Image Annotation using Personal Calendars as Context", In Proceedings of the 16th ACM International Conference on Multimedia, Oct. 226, 2008, 4 pages.

Glorot, et al., "Domain Adaptation for Large-Scale Sentiment Classification: A Deep Learning Approach", In Proceedings of the 28th International Conference on Machine Learning, Jun. 28, 2011, 8 pages.

Guillaumin, et al., "Tagprop: Discriminative Metric Learning in Nearest Neighbor Models for Image Auto-Annotation", In Proceedings of 12th International Conference on Computer Vision, Sep. 29, 2009, 8 pages.

Imran, et al., "Event Recognition from Photo Collections via PageRank", In Proceedings of the 17th ACM international conference on Multimedia, Oct. 19, 2009, pp. 621-624.

Ji, et al., "Labeling Images by Integrating Sparse Multiple Distance Learning and Semantic Context Modeling", In Proceedings of the 12th European conference on Computer Vision—Volume Part IV, Oct. 7, 2012, pp. 688-701.

Krizhevsky, et al., "ImageNet Classification with Deep Convolutional Neural Networks", In Proceedings of 26th Annual Conference on Neural Information Processing Systems, Dec. 3, 2012, 9 pages.

Le, et al., "Building High-level Features using Large Scale Unsupervised Learning", In Proceedings of the 29th International Conference on Machine Learning, Jun. 26, 2012, 11 pages.

Li, et al., "Learning Tag Relevance by Neighbor Voting for Social Image Retrieval", In Proceedings of the 1st ACM International Conference on Multimedia Information Retrieval, Oct. 30, 2008, 8 pages.

Liu, et al., "Tag Ranking", In Proceedings of the 18th International Conference on World Wide Web, Apr. 20, 2009, pp. 351-360.

Lowe, David G., "Distinctive Image Features from Scale-Invariant Keypoints", In International Journal of Computer Vision, vol. 60, Issue 2, Jan. 5, 2004, 28 pages.

Masci, Jonathan, "Stacked Convolutional Auto-Encoders for Hierarchical Feature Extraction", In Proceedings of the 21th International Conference on Artificial Neural Networks—Volume Part I, Jun. 14, 2011, 8 pages.

Oquab, et al., "Learning and Transferring Mid-Level Image Representations using Convolutional Neural Networks", In 27th IEEE Conference on Computer Vision and Pattern Recognition, Retrieved on: May 7, 2014, pp. 1-10.

Mei, et al., "Probabilistic Multimodality Fusion for Event Based Home Photo Clustering", In Proceedings of IEEE International Conference on Multimedia and Expo, Jul. 9, 2006, pp. 1757-1760.

Oliva, et al., "Building the Gist of a Scene: The Role of Global Image Features in Recognition", In Proceedings of Progress in Brain Research, vol. 155, Retrieved on: May 7, 2014, 17 pages.

Sivic, et al., "Video Google: A Text Retrieval Approach to Object Matching in Videos", In Proceedings of the Ninth IEEE International Conference on Computer Vision—vol. 2, Oct. 13, 2003, 8 pages.

Srivastava, et al., "Discriminative Transfer Learning with Tree-Based Priors", In Proceedings of 27th Annual Conference on Neural Information Processing Systems, Dec. 5, 2013, 12 pages.

Torralba, et al., "Unbiased Look at Dataset Bias", In Proceedings of the IEEE Conference on Computer Vision and Pattern Recognition, Jun. 20, 2011, pp. 1521-1528.

Torralba, et al., "80 Million Tiny Images: A Large Data Set for Nonparametric Object and Scene Recognition", In Journal of IEEE Transactions on Pattern Analysis and Machine Intelligence, vol. 30, Issue 11, Nov. 2008, 14 pages.

Tsai, et al., "Large-scale Image Annotation using Visual Synset", In Proceedings of IEEE International Conference on Computer Vision, Nov. 6, 2011, 8 pages.

Wang, et al., "Annosearch: Image Auto-Annotation by Search", In Proceedings of the IEEE Computer Society Conference on Computer Vision and Pattern Recognition—vol. 2, Jun. 17, 2006, 8 pages.

Yu, et al., "Deep Learning with Kernel Regularization for Visual Recognition", In Proceedings of Advances in Neural Information Processing Systems, Dec. 8, 2008, 8 pages.

Gong, et al., "Deep Convolutional Ranking for Multilabel Image Annotation", In proceedings of CORR, Dec. 2013, 9 pages.

Satish, Arjun., "CueNet: A Context Discovery Framework to Tag Personal Photos", In Proceedings of International Conference on Multimedia Retrieval, Apr. 16, 2013, 4 pages.

Yuan, et al., "Tag-Aware Image Classification Via Nested Deep Belief Nets", In IEEE International Conference on Multimedia and Expo, Jul. 15, 2013, 6 pages.

Barthelmess, et al., "Toward Content-aware Multimodal Tagging of Personal Photo Collections", In Proceedings of Ninth International Conference on Multimodal Interfaces, Nov. 12, 2007, 4 pages.

Karpathy, et al., "Large-Scale Video Classification with Convolusional Neural Networks", 2014 IEEE Conference on Computer Vision and Pattern Recognition, Jun. 23, 2014, retrieved on Sep. 24, 2014, pp. 1725-1732.

The PCT Search Report mailed Jan. 21, 2016 for PCT application No. PCT/US2015/054351, 12 pages.

"Second Written Opinion Issued in PCT Application No. PCT/US2015/054351," Mailed Date: Sep. 9, 2016, 7 Pages.

* cited by examiner

TAGGING PERSONAL PHOTOS WITH DEEP NETWORKS

BACKGROUND

As cameras have become a staple of portable digital devices and the number of users owning portable digital devices has continued to grow at unprecedented rates, the number of personal photos is at an all-time high. One of the fundamental challenges to managing such an increasing number of photos is having appropriate tags on those photos. Conventionally, a user may manually go through each image and add one or more keywords, or tags, to each photo. The tags can identify a location of the picture, an event at which the picture was taken, and so forth. However, people are generally reluctant to spend time tagging their photos. Some automatic tagging techniques have emerged, but there is a need for auto-tagging solutions to better tag personal photos.

SUMMARY

This disclosure describes systems and methods for providing tags for personal photos. In at least one example, a deep network is trained using stacked convolutional auto-encoders and a connected top layer using tagged source images, target images, and a personal photo ontology. The deep network can be used to score concepts that can be used to tag personal photos. The techniques described herein also can tag the personal photos based at least in part on the scored concepts. In some implementations, the scores can also be derived based on metadata associated with the personal photos.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
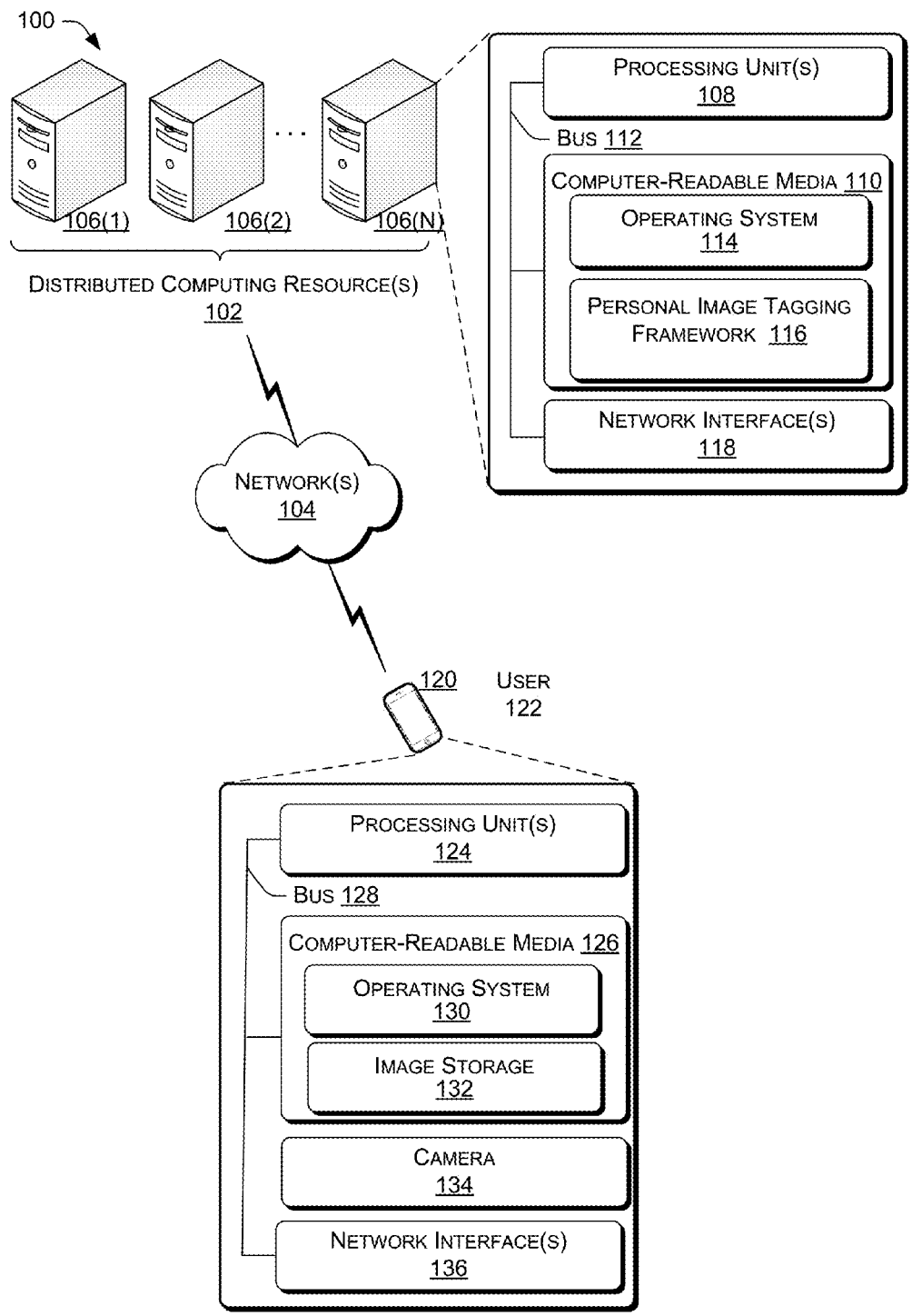
FIG. 1 is a block diagram depicting an example environment for implementing personal photo tagging as described herein.

Examples described herein provide techniques and constructs to tag digital images using resources including, for example, processing units and accelerators. Such resources can be implemented using specialized programming and/or hardware programmed with specific instructions to implement the specified functions. For example, resources can have different execution models as is the case for graphics processing units (GPUs) and computer processing unit (CPUs).

An unprecedented number of people now possess a personal digital device equipped with a camera. As a result, those people are taking more and more digital photographs. While those photos generally have metadata, including a time stamp, organizing and/or searching through digital personal photos is difficult. Several applications allow users to associate tags with their photos, but users are generally reluctant to spend time tagging their photos. More recently, some automatic tagging schemes have been developed. Some such schemes have been model-based and some model-free. Generally, the model-based approach heavily relies on pre-trained classifiers with machine learning algorithms, while the model-free approach propagates tags through the tagging behavior of visual neighbors. Both approaches, however, assume the availability of a well-labeled dataset having the same or at least similar data distribution to the target domain, so the well-labeled dataset can ensure good generalization abilities for both the training and propagation. The conventional scheme can collect the labeled dataset by crawling top ranked images from commercial image search engines. However, personal photos may not map well to commercial images. The semantic distribution of personal photos is only a subset of a general vocabulary of Web images. For example, personal names of celebrities and very specific terms are less likely to appear in personal photos. Moreover, the semantic distribution in personal photos may be biased toward fewer concepts. In addition, personal photos are generally lower quality, and may include more objects than a commercial photo taken to convey a single object.

The system described herein can provide one or more tags for personal photos. The techniques described herein can use deep learning techniques to discover middle-level feature abstractions from raw image pixels and/or from high-level ontology priors. The techniques can be used to tag a single photo, or can be used to tag a group of photos.

In various examples, an algorithm for tagging personal photos can be determined by designing a domain-specific ontology, e.g., for personal photos. The techniques described can use images from a source domain having tagged photos and images from a target domain having untagged personal photos to train a deep network in a bottom-up transfer. The techniques can then fine-tune the network. In some embodiments, the architecture can train a top layer of the deep network using the ontology in a top-down transfer.

Once trained, the deep network can be used to apply tags from the ontology on personal photos. The network may consider a single personal photo, or multiple photos can be batch processed. In some implementations, by batch processing, the application of the deep network to tag photos may also take into account metadata from the photos. For example, time or location data can be meaningful in applying tags when more than one photo is considered at a time.

Examples of a personal photo tagging framework are presented in greater detail in the following description and the accompanying figures.

Experiments employing the techniques described herein on a commercial image search engine with a large-scale search log having 21 million users and 41 million queries over a two-week period show that the framework described herein provides up to 50% better query prediction over existing systems. Example experimental results are presented in greater detail in the description of the following figures.

Examples described herein provide techniques and constructs applicable to tagging personal digital images. In various instances, a processing unit configured via programming from modules or APIs to perform techniques as described herein can include one or more of a GPU, a field-programmable gate array (FPGA), another class of digital signal processor (DSP), or other hardware logic components that can, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Various examples, scenarios, and aspects are described further with reference to FIGS. 1-4.

Illustrative Environment

FIG. 1 shows an example environment 100 in which examples of tagging of personal photos can operate. In some examples, the various devices and/or components of environment 100 include distributed computing resources 102 that can communicate with one another and with external devices via one or more networks 104.

For example, the network(s) 104 can include public networks such as the Internet, private networks such as an institutional and/or personal intranet, or some combination of private and public networks. The network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network(s) 104 can utilize communications protocols, including packet-based and/or datagram-based protocols such as internet protocol (IP), transmission control protocol (TCP), user datagram protocol (UDP), or other types of protocols. Moreover, the network(s) 104 can also include a number of devices that facilitate network communications and/or form a hardware basis for the networks, such as switches, routers, gateways, access points, firewalls, base stations, repeaters, backbone devices, and the like.

In some examples, the network(s) 104 can further include devices that enable connection to a wireless network, such as a wireless access point (WAP). The network(s) can support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, the distributed computing resources 102 include devices 106(1)-106(N). In implementations of this disclosure, the distributed computing resources 102 include a search engine or are operated in conjunction with a search engine. Examples support scenarios where the device(s) 106 can include one or more computing devices that operate in a cluster or other grouped configuration to share resources, balance load, increase performance, provide fail-over support or redundancy, or for other purposes. The device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as desktop computers, the device(s) 106 can include a diverse variety of device types and are not limited to a particular type of device. The device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

The device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on the computer-readable media 110 can include, for example, an operating system 114, a personal image tagging framework 116, and/or other modules, programs, or applications that are loadable and executable by the processing unit(s) 108. Alternatively, or in addition, the functionally described herein can be performed, at least in part, by one or more hardware logic components such as accelerators. For example, and without limitation, illustrative types of hardware logic components that can be used include FPGAs, ASICs, ASSPs, SOCs, CPLDs, etc. For example, an accelerator can represent a hybrid device, such as one from ZYLEX or ALTERA that includes a CPU course embedded in an FPGA fabric.

The device(s) 106 can also include one or more network interface(s) 118 to enable communications between the device(s) 106 and other networked devices, such as a client computing device 120 or other device(s) 106. Such network interface(s) 118 can include one or more network interface controllers (NICs) or other types of transceiver devices to send and receive communications over a network. For simplicity, other components are omitted from the illustrated device 106.

The client computing device 120 is involved in the personal image tagging systems described herein. The client computing device 120 is illustrated as a handheld or mobile-type device. However, the device 120 can belong to a variety of categories or classes of devices, which can be the same as or different from the devices 106, such as traditional client-type devices, desktop computer-type devices, mobile-type devices, special purpose-type devices, embedded-type devices, and/or wearable-type devices. Thus, although illustrated as a mobile computing device, which can have less computing resources than device(s) 106, the client computing device 120 can include a diverse variety of device types and are not limited to any particular type of device. The client computing device 120 can include, but is not limited to, computer navigation type client computing devices such as satellite-based navigation systems including global positioning system (GPS) devices and other satellite-based navigation system devices, telecommunication devices such as mobile phones, tablet computers, mobile phone/tablet hybrid devices, personal data assistants (PDAs), laptop computers, other mobile computers, wearable computers, implanted computing devices, desktop computers, personal (e.g., desktop) computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to receive user input. Generally, each of the devices 120 can be any device that can store digital images and is capable of communicating with the personal image tagging framework operating on or in connection with distributed computing resource(s) 102.

A user 122 also is illustrated as being associated with the client computing device 120. In some implementations, the user 122 could also or alternatively include one or more designees of the user such as an assistant of the user, a supervisor of the user, a spouse of the user, a parent of the user, and/or another entity to whom the user grants permission to access the particular user's client device 120.

The client computing device 120 of the various categories or classes can represent any type of computing device having one or more processing unit(s) 124 operably connected to computer-readable media 126 such as via a bus 128, which in some instances can include one or more of a system bus, a data bus, an address bus, a PCI bus, a Mini-PCI bus, and any variety of local, peripheral, and/or independent buses.

Executable instructions stored on computer-readable media 126 can include, for example, an operating system 130 and/or modules, programs, or applications that are loadable and executable by processing units(s) 124. Alternatively, or in addition, the functionally described herein can be performed, at least in part, by one or more hardware logic components such as accelerators. For example, and without limitation, illustrative types of hardware logic components that can be used include FPGAs, ASICs, ASSPs, SOCs, CPLDs, etc. For example, an accelerator can represent a hybrid device, such as one from ZYLEX or ALTERA that includes a CPU course embedded in an FPGA fabric.

The client computing device 120 also includes image storage 132 for storing personal images. The images may be captured using a device-associated camera 134, although in some embodiments, the images could be captured using a device other than the camera 134. In some embodiments, the device 120 may not include the camera 134 but images can be uploaded or otherwise transferred to the computing device 120, e.g., from a device equipped with a camera.

The client computing device 120 can also include one or more network interfaces 136 to enable communications between the client computing device 120 and other networked devices, such as other client computing device(s) 120 (for example, to share and/or associate information among multiple devices 120 owned by a single user 122) or the devices 106, over the network(s) 104. Such network interface(s) 136 can include one or more network interface controllers (NICs) or other types of transceiver devices to send and receive communications over a network. In one example, the client computing device 120 can send digital image files to the remote devices 106 for tagging by the personal image tagging framework 116. The client computing device 120 can then receive one or more tags for association with the sent image file(s).

Figure 2:
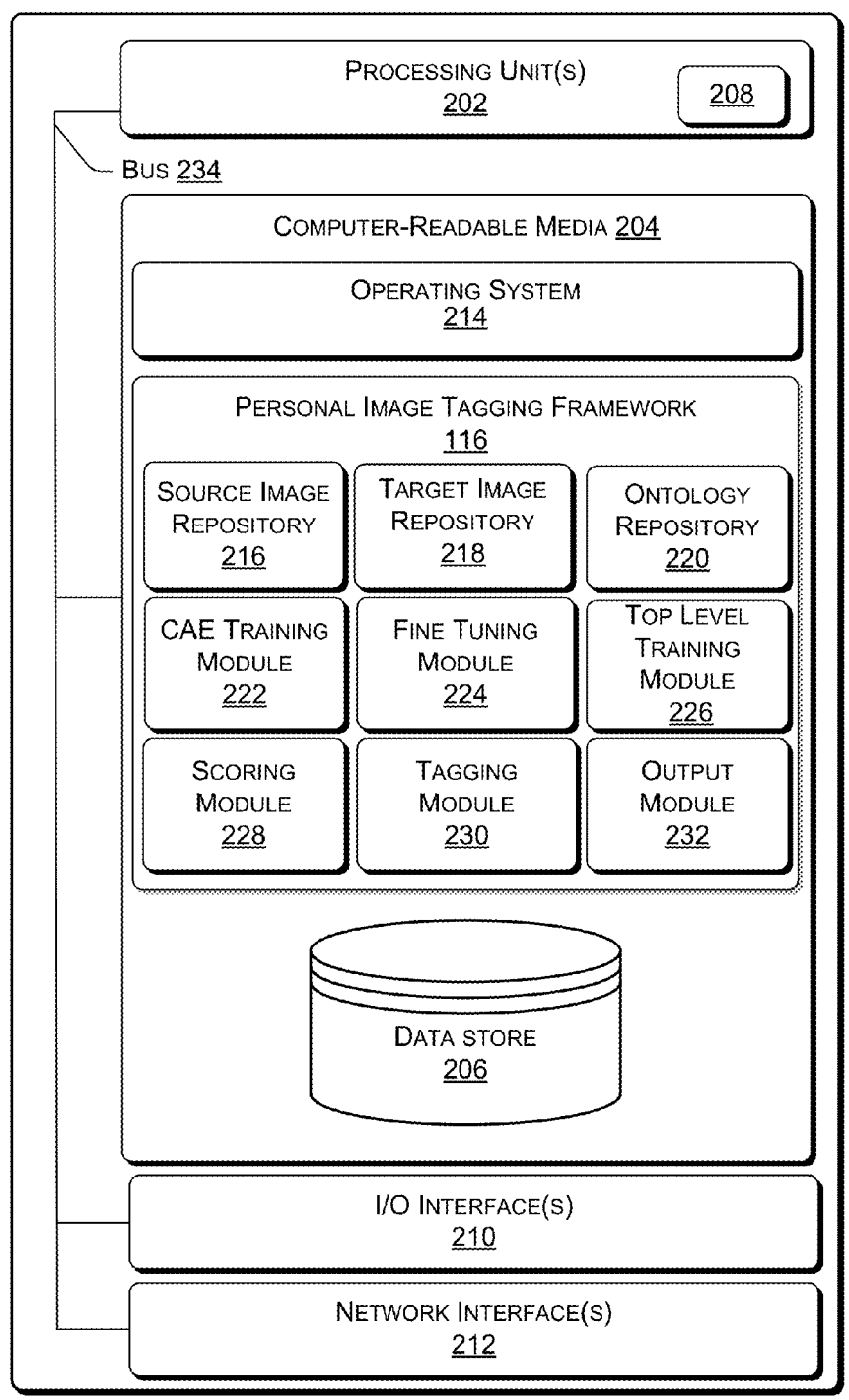
FIG. 2 is a block diagram depicting an example computing device of a distributed computing resource.

FIG. 2 is a block diagram depicting an example computing device 200 of a distributed computing resource, such as a device 106 from FIG. 1. In the device 200, one or more processing unit(s) 202, which can be the processing unit(s) 108 of FIG. 1, can represent, for example, a CPU-type processing unit, a GPU-type processing unit, an FPGA, another class of digital signal processor (DSP), or other hardware logic components that can, in some instances, be driven by a CPU. For example, and without limitation, illustrative types of hardware logic components that can be used include ASICs, ASSPs, SOCs, CPLDs, etc.

In some examples, computer-readable media 204, which can be the computer-readable media 110 of FIG. 1 can store instructions executable by the processing unit(s) 202, which as discussed above, can represent a processing unit incorporated in device 200. The computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in the device 200, while in some examples one or more of a CPU, GPU, and/or accelerator is external to the device 200.

In the illustrated example, the computer-readable media 204 also includes a data store 206. In some examples, the data store 206 includes data storage such as a database, data warehouse, or other type of structured or unstructured data storage. In some examples, the data store 206 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. The data store 206 can store data for the operations of processes, applications, components, and/or modules stored in computer-readable media 204 and/or executed by processing unit(s) and/or accelerator(s) 202. The data store 206 can store a trained deep network, source images for training the deep network, or other information that can be used to aid in tagging images. Some or all of the above-referenced data can be stored on separate memories 208 on board one or more processing unit(s) 202 such as a memory on board a CPU-type processor, a GPU-type processor, an FPGA-type accelerator, a DSP-type accelerator, and/or another accelerator.

The device 200 can further include one or more input/output (I/O) interfaces 210 to allow the device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in the device 200, one or more network interface(s) 212, which can be network interface(s) 118 shown in FIG. 1, can represent, for example, network interface controllers (NICs) or other types of transceiver devices to send and receive communications over a network.

In the illustrated example, the computer-readable media 204 includes an operating system 214, which can be the operating system 114 of FIG. 1. The computer-readable media 204 also includes the personal image tagging framework 116. The framework 116 can include one or more modules and/or APIs, which are illustrated as blocks 216, 218, 220, 222, 224, 226, 228, and 230 although this is just an example, and the number can vary higher or lower. Functionality described associated with blocks 216, 218, 220, 222, 224, 226, 228, and 230 can be combined to be performed by a fewer number of modules and/or APIs or it can be split and performed by a larger number of modules and/or APIs.

In the illustration, blocks 216 and 218 generally represent a source image repository module and a target image repository module, respectively, each with logic to program the processing unit 202 of the device 200 for accessing source/target images, which can be images from an image repository stored in data store 206 or an external data store. The source images are digital images that are tagged. The target images may or may not be tagged, although in various examples described herein, the tags of the target images are not considered. In some examples, the source images and/or the target images may be digital photos from a web-based source. In at least one example, the source images may be obtained from ImageNet and the target images may be obtained from Flickr.

Block 220 generally represents an ontology repository module with logic to program the processing unit 202 of the device 200 for accessing an ontology, which can be stored in data store 206 or an external data store. In some examples, the ontology can be a tree structure, in which each textual tag represents a leaf node and the leaf nodes are grouped into a plurality of middle-level nodes. The middle-level nodes can be merged into a single root node. An example ontology will be described in more detail below with reference to FIG. 4.

Block 222 generally includes a convolutional autoencoder (CAE) training module with logic to program the processing unit 202 of the device 200 to train at least one CAE. In some embodiments, the CAE comprises a plurality of CAEs in a stacked arrangement. In some embodiments, the CAE(s) is trained on both the source and target domains in an unsupervised manner, from which shared deep feature abstractions can be discovered from the raw pixels. The abstraction can be discovered across the two domains, i.e., the tagged photos in the source domain and the untagged photos in the target domain.

Block 224 generally represents a fine tuning module with logic to program the processing unit 202 of the device 200 to fine tune shared deep feature abstractions, which can be the abstractions determined by the CAE training module of block 222. The fine-tuning process can be implemented using the supervision in the source domain to provide the network with stronger discriminability.

Block 226 generally represents a top level training module with logic to program the processing unit 202 of the device 200 to train a top layer of a deep network. The top layer can be a fully connected layer with ontology priors (an FCO layer). Training of the top layer can include the fine-tuned shared deep feature abstractions obtained in block 224.

Blocks 222, 224, and 226 generally represent training modules with logic to program the processing unit 202 of the device 200 to train a deep network. In some embodiments, blocks 222 and 224 can represent a process of deep learning with bottom-up transfer, e.g., which can ensure good generalization abilities in transfer learning. As noted above, the block 222 can be an unsupervised training whereas the block 224 can be supervised by source and target domains. Block 226 can represent a process of deep learning with top-down transfer, e.g., to consider the ontology across the two domains. In some implementations, fewer than all three modules can be used to train a deep network. For example, only bottom-up or top-down transfer can be used. However, using all three modules can produce a better tagging result. For example, because the shared deep feature abstractions and the ontology take effect across the two domains, the resultant parameters can be transferred to the target domain to obtain the middle-level features representation and high confidence levels.

Block 228 generally represents a tagging module with logic to program the processing unit 202 of the device 200 to determine one or more tags for one or more images. The deep network is used to analyze photos. The deep network can provide scores for tagging concepts, with the tags being chosen by the tagging module based on the scores. For example, the tagging module can choose all tags that have a score above a threshold score, or the tagging module can choose a predetermined number of tags having the highest scores. Moreover, in determining tags, the tagging module can consider a single image at a time, or can consider multiple images. Metadata associated with the image files can be useful across multiple images, for example.

Block 230 represents an output module with logic to program the processing unit(s) 202 of the device 200 to associate the tag(s) with the image(s). The output module can also send the tag(s) to the input/output interface 210 and/or the network interface 212.

Bus 234, which can be bus 112 and which in some instances can include one or more of a system bus, a data bus, an address bus, a PCI bus, a Mini-PCI bus, and any variety of local, peripheral, and/or independent buses, can operably connect the computer-readable media 204 to the processing unit(s) 202.

Figure 3:
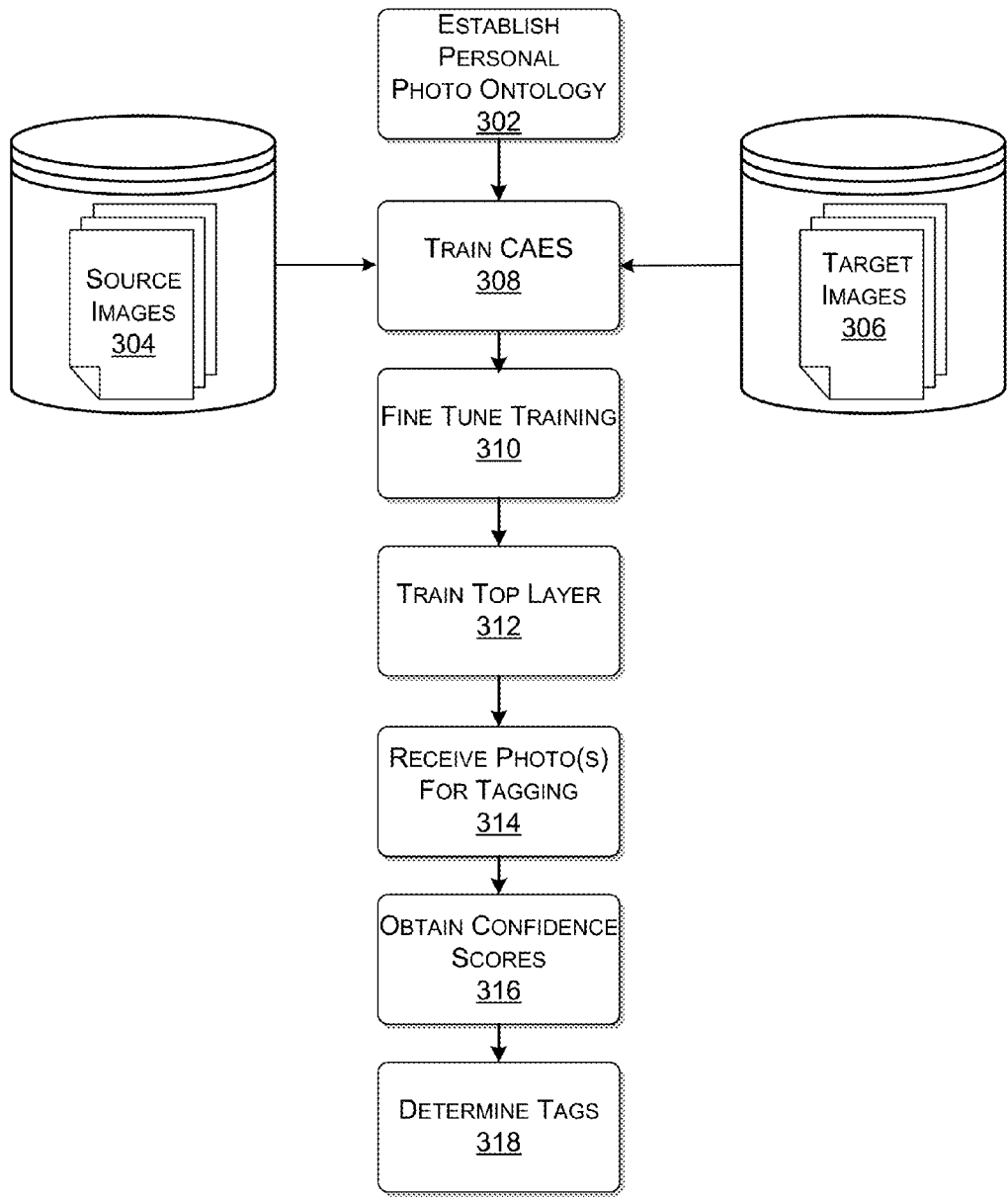
FIG. 3 is a block diagram depicting an example process architecture that can perform personal photo tagging.

FIG. 3 is a block diagram depicting an example architecture 300 of processes that the personal image tagging framework 116 can perform to facilitate image tagging. Various portions of the architecture 300 can be done via offline processing and/or via query-time processing. In some examples, a user can upload one or more images for tagging to the device 102 or an application containing some of the architecture can be contained on the device 120. In some examples, the deep network can be trained on the device 120 but the tagging is done via an application on the device 120.

The architecture 300 includes establishing a personal photo ontology at 302. The ontology can be specific to personal photos because the vocabulary for Web images may be too large in some aspects, but not specific for certain attributes of personal photos. In one example, an ontology for personal photos can be developed by determining concepts, i.e., semantic words or phrases, that are likely to appear in personal photos. These concepts are tags that could be applied to a photo according to implementations of this disclosure. The concepts can be considered leaf nodes in a tree structure and manually grouped into middle-level nodes or categories according to their semantic correlations. The middle-level nodes can also be merged into a root node.

Figure 4:
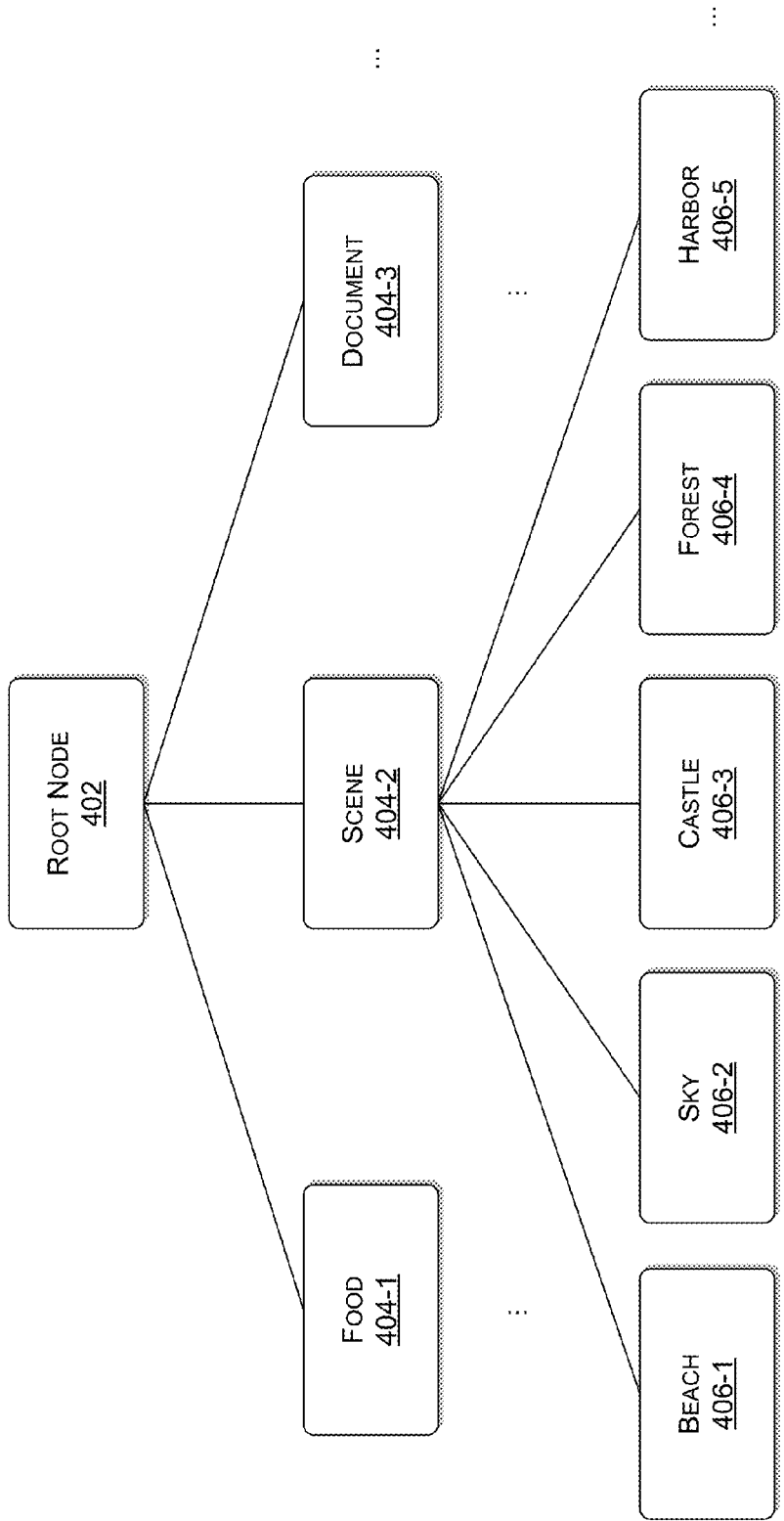
FIG. 4 is block diagram of an example ontology that can be used for tagging personal photos

FIG. 4 illustrates a three-layer tree-structured ontology such as that just described. In FIG. 4, 402 represents a root node; 404-1, 404-2, 404-3, . . . , represent middle level nodes or categories; and 406-1, 406-2, etc., represent the leaf nodes, or concepts. In this ontology, the concepts, e.g., beach 406-1, sky 406-2, represent textual tags that may be associated with images. Of course, the ontology is not limited to the size or structure of this example ontology. Moreover, as described throughout this disclosure, the ontology is used to train a network as well as to tag images. Thus, in some embodiments, concepts in the ontology can be chosen because of their use in a source database. For example, the ontology may prefer "young girl" and "young boy" as concepts to "teenager" because the source database uses the former.

The architecture 300 includes operations on source images 302 and target images 304. The source images 302 can be tagged images, whereas the target images are personal photos that are not tagged. The source and target images can be from public image databases. In some instances, the ontology concepts can be adjusted to correspond to concepts already used in the source database. Aspects of the architecture 300 will be described with reference to an example implementation. The reference example is but one non-limiting example, and is provided herein as detail of possible embodiments that can be included within the architecture. In the example, X=$[x_1, \ldots, x_n] \in \mathbb{R}^{d \times N}$ is a set of N training data with d dimensions and Y=$[y_1, \ldots y_N] \in \mathbb{R}^{K \times N}$ is a corresponding label matrix. The labels in the target domain are unknown, while in the source domain each label $y_i$ is a K dimensional output for leaf nodes in the ontology. A correct concept in the ontology is assigned a value of 1, whereas 0 is assigned otherwise. In this example, W denotes the set of parameters for use in the stacked CAEs (e.g., the weights and biases) and B denotes parameters of a top FCO layer, B$\in \mathbb{R}^{K \times D}$. D represents the dimension of the transformed feature after CAEs. Given X, the parameter learning can be determined by a conditional distribution over Y, which can be formulated according to Equation (1), as follows:

$$\max_{W,B}\{P(Y|X)\} = \max_{W,B}\{\Sigma_{W,B} P(Y|X, WcB)P(W)P(B)\} \quad (1)$$

where W and B can be optimized using transfer deep learning procedures.

Specifically, the architecture can optimize W using a two-step procedure, represented by 308 and 310. For example, at step 308 the architecture 300 trains stacked CAEs and at 310 the architecture 310 fine-tunes the results. In some examples, 308 trains CAEs in an unsupervised manner to learn shared middle-level feature abstractions. The abstractions can then be fine-tuned in a supervised manner at 310 using the source and target domains. Some examples of these techniques will be described below.

At 308, an autoencoder (AE) can be used to build a deep network, which can be used for learning an effective encoding of original data without using supervised labels. An AE generally includes an encoder function $f_W(x_i)$ and a decoder function $g_{W'}(x_i)$, in which $x_i$ is an input and W and W' are the parameters of the encoder and the decoder, respectively. A fully connected AE is a basic form and can be used, but the fully connected AE may not consider the high dimensionality and spatial structure of an image. In some embodiments of this disclosure, the CAE is used. In the CAE weights are shared among all locations in the input and the CAE scales well to realistic-sized high-dimensional images as the number of free parameters for the shared weights does not depend on the input dimensionality. For the input $x_i$, the hidden representation of the $j^{th}$ feature map can be given as shown in Equation (2):

$$h_j = f_{W_j}(x_i) = \sigma(x_i * W_j) \quad (2)$$

in which $\sigma$ is the activation function and * denotes the two-dimensional convolution. The reconstruction of $x_i$, i.e., $r_i$, is obtained as shown in Equation (3):

$$r_i = g_{W'}(f_W(x_i)) = \sigma(\Sigma_{j \in H} h_j * W'_j) \quad (3)$$

in which H denotes the set of all the hidden feature maps and W' is usually forced to be the transpose of W. A cost function can be defined to minimize the reconstruction error over all the training data using mean squared error. For example, a cost function can be defined as shown in Equation (4):

$$cost(W) = \frac{1}{2N} \sum_{i=1}^{N} (x_i - r_i)^2 \quad (4)$$

In example embodiments, the cost function can be solved by a back propagation algorithm, as in some conventional deep networks.

The architecture 300 can include several convolutional auto encoders to form a stacked CAEs. This arrangement can build deep networks. In one example, five CAEs are stacked. Unsupervised training can be carried out in the stacked CAES in greedy layer-wise fashion. This unsupervised training may well guide the learning and support better generalization from the training set. The fine-tuning, in step 310, may further enhance the discriminability through supervised fine-tuning, in step 310. For example, when W represents the overall parameters of the CAE layer(s) after fine tuning, and once W is learned, a transformed feature representation for X can be represented by modifying Equation (1) as shown in Equation (5):

$$\max_{B}\{P(Y|X)\} = \max_{B}\{\Sigma_B P(Y|f_W(X), B)P(B)\} \quad (5)$$

At 312, a fully-connected top layer with oncology priors (the "FCO layer") can be learned. The FCO layer is learned on the shared feature abstractions in the source domain and transferred to the target domain. In some examples, the relationship among different concepts in the ontology can be inherited across the two domains. By way of non-limiting example, a middle-level node "animal" can include the same leaf nodes (e.g., "cow," "bird," etc.) in both the source and target domains. Based on the shared feature abstractions and the inherited relationship, parameters of the FCO layer can be learned from the source domain and transferred to the target with little gap. The ontology priors can enhance the correlations among close concepts and weaken the correlations among dissimilar concepts, thereby boosting prediction accuracy. The ontology priors can be introduced into Equation (5), by fixing W, as it has been learned from the CAES, and maximizing Equation (6):

$$P(Y|X) = \Sigma_{B,\theta} P(Y|f_W(X),B)P(B|\theta)P(\theta) \quad (6)$$

in which B=$[\beta_1, \ldots, \beta_K] 2\in \mathbb{R}^{K \times D}$ and $\theta=[\theta_1, \ldots, \theta_M]T \in R^{M \times D}$ are the priors of the leaf nodes and the middle-levl nodes in the defined ontology, respectively. M and K are the number of middle-level nodes and leaf nodes, respectively. In some examples, the prior over a leaf node is constrained by its immediate middle-level node, i.e., parent node, in the form of a conditional probability. A function parent(*) can be defined as a mapping from leaf nodes to their middle-level nodes. In this example, if k and m are indexes of a leaf node and a middle-level node separately, then parent(k)=m.

In this example, a choice of priors B and $\theta$ can be a Gaussian distribution. B and $\theta$ can thus be described according to the forms of Equation (7):

$$\beta_k \sim N\left(\theta_{parent(k)}, \frac{1}{\lambda_1} I_D\right), \theta_{parent(k)} \sim N\left(0, \frac{1}{\lambda_2} I_D\right) \quad (7)$$

in which $\beta_K \in \mathbb{R}^D$ denotes the prior for the $k^{th}$ leaf node, whose mean is determined by its parent $\theta_{parent(k)}$ and ID is a diagonal covariance. $\theta_M$ is a prior of the $m^{th}$ middle-level node in the ontology and consists of a set of $\beta_K$ leaf nodes where parent(k)=m. When Cm=|{k|parent(k)=m}| and |•| denotes the cardinality of a set. As $\beta_K$ and $\theta_M$ are Gaussian distributions in this example, given $\beta_K$, $\theta_M$ can be represented as shown in Equation (8):

$$\theta_M = \frac{1}{c_m + \frac{\lambda_2}{\lambda_1}} \Sigma_{parent(k)=m} \beta_K, \quad (8)$$

in which $\theta_M \in \mathbb{R}^D$. MAP estimation can be applied to determine the value of the FCO layer's parameters B and θ, for example, by maximizing Equation (9):

$$\log P(Y|f_W(X),B) + \log P(B|\theta) + \log P(\theta). \quad (9)$$

In some examples, mean squared error can be selected to represent loss, and the loss function can be expressed as shown in Equation (10):

$$\min_{B,\theta} \left\{ \|Bf_W(X) - Y\|^2 + \frac{\lambda_1}{2} \sum_{k=1}^{K} \|\beta_k - \theta_{parent(k)}\|^2 + \frac{\lambda_2}{2} \|\theta\|^2 \right\} \quad (10)$$

In this example, the loss function of Equation (10) can be efficiently solved by transforming the $\theta \in \mathbb{R}^{M \times D}$ matrix into the same dimension as B. More specifically, when $\theta = [\theta_{parent(1)}, \theta_{parent(2)} \ldots, \theta_{parent(K)}]^T \in \mathbb{R}^{K \times D}$, Equation 10 can be simplified as shown in Equation 11:

$$\min_{B,\theta} \left\{ \|Bf_W(X) - Y\|^2 + \frac{\lambda_1}{2} \|\beta - \theta\|^2 + \frac{\lambda_2}{2} \|\theta\|^2 \right\} \quad (11)$$

Moreover, fixing θ sets the derivative of B of Equation (11) to zero, and B can be updated according to Equation (12):

$$B = (2Yf_W(X)^T + \lambda_1 \theta)(2f_W(X)f_W(X)^T + \lambda_1 I)^{-1} \quad (12)$$

wherein I is an identity matrix. With this updated B, θ can be recalculated by Equation (8) and be transformed again. Accordingly, Equation (11) can be optimized by iteratively updating B and θ until the difference between two successive iterations is below a threshold. In some examples, the threshold can be $10^{-4}$.

The foregoing describes examples of training a deep network using an FTO layer with source and target data. At 314, the architecture 300 receives photos for tagging. The network can be used to tag personal photos one at a time, or using a batch process. In both processes, the architecture can obtain confidence scores at 316, and determine tags based on those scores at 318.

In an example of tagging a single image, $x \in \mathbb{R}^d$ can represent the raw pixels of a single photo. Entering x into the CAES, will result in a transformed feature representation $f_W(x) \in \mathbb{R}^D$. In this approach, the tagging problem can be formulated as shown in Equation (13):

$$\min_y \|Bf_W(x) - y\|^2, \quad (13)$$

where $y \in \mathbb{R}^K$ denotes the label vector indicating a confidence score for each concept. A closed form solution of y is then shown by Equation (14):

$$y = Bf_W(x) \quad (14)$$

In this example, the values y can be used to identify the most likely candidates for tagging results. In some examples, the values can be ranked, with tags associated with some number of top scores being used as to tag the photo. In other examples, tags associated with scores above a threshold score can be chosen as the tagging results.

In some examples, it can be more desirable to consider and tag multiple photos at a time. Oftentimes, a user will take multiple pictures of a thing, event, or person, and considering more than one of those photos at a time can provide better results. Metadata, such as a geo-location, a time stamp, and the like, is often stored with digital photos. An absolute timestamp may not be particularly useful for understanding a photo using algorithms, but timestamps for plural photos in a photo collection may be useful in discovering the relationship among photos, thereby potentially increasing the tagging performance. For example, if the timestamps of two photos are close, it may be inferred that they are from the same event, and that tagging results of the two events should be closely correlated. Similarly, information about a location of a group of photos may provide further relational information. Other metadata could also or alternatively be used.

In one example, timestamps are used to improve tagging for a photo collection $X \in \mathbb{R}^{d \times N}$ containing N photos and a label matrix $Y \in \mathbb{R}^{K \times N}$. In this example, an affinity matrix $S \in \mathbb{R}^{N \times N}$ can be constructed according to Equation (15):

$$S = \begin{cases} \exp\left(-\frac{\|t_i - t_j\|^2}{\gamma^2}\right), & |t_i - t_j| < T \\ 0, & \text{otherwise} \end{cases} \quad (15)$$

where $t_i$ denotes the timestamp of photo i, γ is a free parameter to control the decay rate and T is a threshold. In a photo collection, if the difference of timestamps between two photos is smaller than T, the two photos are likely to share the tagging results. Considering the time constrains and visual clues simultaneously, the objective function of the batch-mode can be determined in accordance with Equation (16):

$$\min_Y \{ Tr[Y^T L Y] + \|Bf_W(X) - Y\|^2 \} \quad (16)$$

where L=A−1/2 (A−S) A−1/2 and A is a degree matrix defined as the diagonal matrix with the degrees $a_1, \ldots, a_N$ on the diagonal and $a_i = \Sigma_{j=1}^N S_{i,j}$. By setting the derivative of Y to zero, the above optimization has a closed formed solution as shown in Equation (17):

$$Y = 2Bf_W(x)(L + L^T + 2I)^{-1} \quad (17)$$

where I is an identify matrix and the matrix Y indicates the tagging results of the whole collection, where each column is a set of confidence scores of a single photo in the collection. Tags can be applied to each photo based on the confidence scores. For example, tags associated with scores above a threshold can be applied to the photo, or tags associated with some predetermined number of the highest confidence scores can be applied, or some combination thereof, can be used to tag the photos.

Example Clauses

A: A method comprising: providing an ontology for personal digital images, the ontology comprising a hierarchy including a plurality of concepts grouped into a plurality of nodes of the hierarchy, each of the plurality of concepts comprising a textual descriptor for association with one or more personal digital images; providing a plurality of source digital images from a source domain, each of the source digital images having at least one associated textual descriptor; providing a plurality of target digital images from a target domain; training, on a computing device, a deep network using the source digital images, the target digital images, and the ontology; receiving, at the computing device, one or more personal digital images; applying, using the computing device, the deep network to the one or more personal digital images to determine one or more of the concepts for association with each of the one or more personal digital images; and associating at least one of the one or more of the concepts to each of the one or more personal digital images.

B: A method as paragraph A recites, wherein the training the deep network comprises determining deep feature abstractions.

C: A method as either paragraph A or B recites, wherein the determining the deep feature abstractions comprises training a plurality of convolutional autoencoders on the source digital images and the target digital images.

D: A method as any of paragraphs A-C recites, further comprising fine-tuning the deep feature abstractions using the ontology to obtain fine-tuned deep feature abstractions.

E: A method as any of paragraphs A-D recites, wherein the applying the deep network comprises applying the fine-tuned deep feature abstractions to the one or more of the personal digital images.

F: A method as any of paragraphs A-E recites, further comprising creating the ontology for personal digital images by: identifying the plurality of concepts; grouping the plurality of concepts into a plurality of categories, each of the plurality of categories comprising one or more of the plurality of concepts; and associating each concept with a concept textual expression that matches a source textual expression used in a source domain to identify the concept in images stored in the source domain.

G: A method as any of paragraphs A-F recites, wherein the instructing display of the representative image to the identified user is performed in the absence of a contemporaneous search by the identified user.

H: A method as any of paragraphs A-G recites, wherein the applying the deep network to one or more of the personal digital images comprises considering attributes of the one or more of the personal digital images to assign the one or more concepts.

I: A computer readable medium having computer-executable instructions thereon, the computer-executable instructions to configure a computer to perform a method as any of paragraphs A-H recites.

J: A device comprising: a computer-readable media having computer-executable instructions thereon to configure a computer to perform a method as any of paragraphs A-H recites, the processing unit adapted to execute the instructions to perform the method as any of paragraphs A-H recites.

K: A device comprising: one or more computer-readable media having thereon a plurality of modules, a source image repository, a target image repository, and an ontology repository; a processing unit operably coupled to the computer-readable media, the processing unit adapted to execute modules of the plurality of modules comprising: a convolutional autoencoder training module for training one or more convolutional autoencoders comprising a deep network using source images from the source image repository and target images from the target image repository; a top level training module for training a top level of the deep network using an ontology from the ontology repository; a scoring module for determining, for individual of a plurality of images, confidence scores for each of a plurality of concepts in the ontology using the deep network and metadata associated with the plurality of images; and a tagging module for selecting, based at least in part on the confidence scores, one or more of the plurality of concepts for tagging each of the plurality of images.

L: The device as paragraph K recites, wherein the training the one or more convolutional autoencoders comprises discovering the shared deep feature abstractions from raw pixels of the source images and the target images.

M: The device as either paragraph K or paragraph L recites, further comprising a fine tuning module for fine tuning the shared deep feature abstractions in a supervised manner using the source images.

N: The device as any of paragraphs K-M recites, wherein the convolutional autoencoder comprises a stack of a plurality of convolutional autoencoders.

O: A device as any of paragraphs K-N recites, wherein the top layer is a fully connected top layer.

P: A device as any of paragraphs K-O recites, wherein the tagging module selects the concepts corresponding to confidence scores above a threshold score for tagging each of the plurality of images.

Q: A device as any of paragraphs K-P recites, wherein the tagging module selects the concepts corresponding to a predetermined number of highest confidence scores for tagging each of the plurality of images.

R: One or more computer readable media having thereon computer-executable instructions, the computer-executable instructions, upon execution, configuring a computer to perform operations comprising: training a deep network comprising a stack of convolutional autoencoders in an unsupervised manner using tagged source images from a source image repository and target images from a target image repository to discover deep feature abstractions from raw pixels of the source images and the target images; fine-tuning the deep feature abstractions in a supervised manner using tags from the tagged source image data to obtain finely-tuned deep feature abstractions; and training a fully connected top layer of the deep network using a personal photo ontology.

S: The media as paragraph R recites, further comprising, for individual of personal digital images, obtaining a confidence score describing a relationship between concepts in the ontology and the individual personal digital images by applying the finely-tuned deep feature abstractions and the trained fully connected top layer to the individual personal photos.

T: The media as paragraph R or S recites, further comprising selecting one or more of the concepts in the ontology to tag the individual of the personal photos based at least on the confidence score.

U: The media as any of paragraphs R-T recites, wherein the obtaining the confidence score further comprises considering metadata from the personal photos.

V: The media as any of paragraphs R-U recites, wherein the metadata comprises at least one of a location or a timestamp.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, and/or 200 such as one or more internal or external CPUs or GPUs, and/or one or more pieces of hardware logic such as FPGAs, DSPs, or other types of accelerators.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "might" or "may," unless specifically stated otherwise, is understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    providing an ontology for personal digital images, the ontology comprising a hierarchy including a plurality of concepts grouped into a plurality of nodes of the hierarchy, the plurality of concepts comprising a textual descriptor for association with one or more personal digital images;
    providing a plurality of source digital images from a source domain, the source digital images having at least one associated textual descriptor;
    providing a plurality of target digital images from a target domain;
    training, on a computing device, a deep network using the source digital images, the at least one associated textual descriptor, the target digital images, and the ontology;
    receiving, at the computing device, a plurality of personal digital images, the plurality of personal digital images having one or more attributes;
    applying, using the computing device, the deep network to the plurality of personal digital images to determine one or more of the concepts for association with the plurality of personal digital images; and
    commonly associating at least one of the one or more of the concepts to a subset of the plurality of personal digital images, the subset of the plurality of personal digital images having the one or more attributes that is within a predetermined threshold of each other.

2. The method of claim 1, wherein the training the deep network comprises determining deep feature abstractions.

3. The method of claim 2, wherein the determining the deep feature abstractions comprises training a plurality of convolutional autoencoders on the source digital images and the target digital images.

4. The method of claim 3, further comprising fine-tuning the deep feature abstractions using the ontology to obtain fine-tuned deep feature abstractions.

5. The method of claim 4, wherein the applying the deep network comprises applying the fine-tuned deep feature abstractions to the one or more of the personal digital images.

6. The method of claim 1, further comprising creating the ontology for personal digital images by:
    identifying the plurality of concepts;
    grouping the plurality of concepts into a plurality of categories, the plurality of categories comprising one or more of the plurality of concepts; and
    associating a concept with a concept textual expression that matches a source textual expression used in a source domain to identify the concept in images stored in the source domain.

7. The method of claim 1, wherein the one or more attributes of the plurality of personal digital images comprises at least one of:
    a location, and the predetermined threshold includes a predetermined distance, or
    a timestamp, and the predetermined threshold includes a predetermined time interval.

8. A device comprising:
    one or more computer-readable media having thereon a plurality of modules, a source image repository, a target image repository, and an ontology repository, the ontology repository storing an ontology comprising a hierarchy including textual descriptors grouped into a plurality of nodes; and a processing unit operably coupled to the computer-readable media, the processing unit adapted to execute modules comprising:
- a convolutional autoencoder training module executable to train one or more convolutional autoencoders comprising a deep network using source images from the source image repository and target images from the target image repository;
- a top level training module executable to train a top level of the deep network using the ontology from the ontology repository;
- a scoring module for determining, for a first digital image, confidence scores for a plurality of the textual descriptors using the deep network and metadata associated with the first digital image; and
- a tagging module for selecting, based at least in part on the confidence scores, one or more of the plurality of textual descriptors for tagging the first digital image, and for tagging the first digital image and a second digital image commonly with the selected one or more of the plurality of textual descriptors, the second digital image having an associated metadata being within a predetermined threshold of the metadata associated with the first digital image.

9. The device of claim 8, wherein the training the one or more convolutional autoencoders comprises discovering the shared deep feature abstractions from raw pixels of the source images and the target images.

10. The device of claim 9, further comprising a fine tuning module for fine tuning the shared deep feature abstractions in a supervised manner using the source images.

11. The device of claim 8, wherein the one or more convolutional autoencoders comprises a stack of a plurality of convolutional autoencoders.

12. The device of claim 8, wherein the top level is a fully connected top layer.

13. The device of claim 8, wherein the tagging module selects the one or more textual descriptors corresponding to confidence scores above a threshold score for tagging the digital image.

14. The device of claim 8, wherein the tagging module selects the concepts corresponding to a predetermined number of highest confidence scores for tagging the digital image.

15. A system comprising:
one or more processors; and
memory storing a plurality of computer-executable instructions, the computer-executable instructions, upon execution, configure the system to perform operations comprising:
- training a deep network comprising a stack of convolutional autoencoders in an unsupervised manner using tagged source images from a source image repository and target images from a target image repository to discover deep feature abstractions from raw pixels of the source images and the target images;
- fine-tuning the deep feature abstractions in a supervised manner using tags from the tagged source image data to obtain finely-tuned deep feature abstractions;
- training a fully connected top layer of the deep network using a personal photo ontology, the personal photo ontology comprising a hierarchy including textual descriptors grouped into a plurality of nodes;
- determining, for a plurality of digital images to be tagged, confidence scores for one or more of the textual descriptors using the deep network, the plurality of digital images having metadata; and
- based at least in part on the confidence scores, tagging the plurality of digital images with at least one of the textual descriptors,
- wherein individual ones of the plurality of digital images having metadata that are within a predetermined threshold of each other are tagged with at least one common textual descriptor.

16. The system of claim 15, wherein a confidence score describes a relationship between the textual descriptors and the individual digital image.

17. The system of claim 16, the operations further comprising selecting one or more of the textual descriptors in the ontology to tag the individual of the digital images based at least on a determination that the confidence score exceeds a threshold score or the confidence score is associated with a predetermined number of top scores.

18. The system of claim 15, wherein the metadata comprises at least one of:
- a location, and the predetermined threshold is a predetermined distance, or
- a timestamp, and the predetermined threshold is a predetermined time interval.

19. The method of claim 3, further comprising fine-tuning the deep feature abstractions in a supervised manner using the source images.

20. The device of claim 8, where in the metadata associated with the first and second digital images are at least one of:
- respective timestamps, and the predetermined threshold includes a predetermined time interval, or
- respective geolocations, and the predetermined threshold includes a predetermined distance.

* * * * *